United States Patent [19]
Hama et al.

[11] Patent Number: 5,750,796
[45] Date of Patent: May 12, 1998

[54] METHOD OF PRODUCING AN ALKYLENE OXIDE ADDUCT OF A COMPOUND HAVING ONE OR MORE ACTIVE HYDROGEN

[75] Inventors: Itsuo Hama, Chiba; Takahiro Okamoto, Saitama; Hisashi Sasamoto; Hirofumi Nakamura, both of Chiba, all of Japan

[73] Assignee: Lion Corporation, Tokyo, Japan

[21] Appl. No.: 702,037

[22] Filed: Aug. 23, 1996

[51] Int. Cl.$^6$ .................................................. C07C 41/03
[52] U.S. Cl. ......................................... 568/618; 568/619
[58] Field of Search ........................................ 568/618, 619

[56] References Cited

U.S. PATENT DOCUMENTS

| | | | |
|---|---|---|---|
| 4,239,917 | 12/1980 | Yang | 568/618 |
| 4,453,022 | 6/1984 | McCain et al. | 568/618 |
| 4,886,917 | 12/1989 | Knopf et al. | 568/623 |
| 5,012,012 | 4/1991 | Nakamura et al. | 568/618 |
| 5,374,750 | 12/1994 | Nakamura et al. | 554/149 |

FOREIGN PATENT DOCUMENTS

| | | |
|---|---|---|
| B-33349/89 | 8/1991 | Australia . |
| 4101740 A1 | 7/1992 | Germany . |
| 42 27 720 A1 | 4/1993 | Germany . |
| 44 46 064 A1 | 6/1995 | Germany . |
| 4446064 A1 | 6/1995 | Germany . |
| WO 90/07980 | 1/1989 | Japan . |
| 01164437 A | 6/1989 | Japan . |
| 6-182206 | 5/1994 | Japan . |

OTHER PUBLICATIONS

Translation to DE 4446064 A1, Hama et al., published Jun. 29, 1995.
Bischoff, K.B., Chemical Reactor Analysis, 77, 197, pp. 76–80, 1979.

*Primary Examiner*—Marianne M. Cintins
*Assistant Examiner*—Dwayne C. Jones
*Attorney, Agent, or Firm*—Morrison & Foerster LLP

[57] ABSTRACT

A method of producing alkylene oxide adduct comprises reacting an organic compound having one or more active hydrogen (for example, higher alcohol, amine, etc.) with alkylene oxide in the presence of an Al.Mg composite oxide catalyst. The catalyst can be obtained by calcining and activating aluminum magnesium hydroxide shown by $nMgO \cdot Al_2O_3 \cdot mH_2O$. In this method, a highly active reaction can be performed, and alkylene oxide adduct having very narrow alkylene oxide adduct molar distribution can be obtained. Since the load in a catalyst separating step is reduced, the catalyst can be efficiently separated. Therefore, the alkylene oxide adduct can be produced at low cost. In addition, the reaction can be performed at high speed, and the reaction time can be reduced.

10 Claims, 1 Drawing Sheet

METHOD OF PRODUCING AN ALKYLENE OXIDE ADDUCT OF A COMPOUND HAVING ONE OR MORE ACTIVE HYDROGEN

FIELD OF THE INVENTION

The present invention relates to a method of producing an alkylene oxide adduct from an organic compound having at least one active hydrogen and alkylene oxide, using Al—Mg composite oxide obtained by calcining and activating aluminum magnesium hydroxide as an alkoxylation catalyst.

BACKGROUND OF THE INVENTION

An alkylene oxide adduct of an organic compound having one or more hydrogen can be used, for example, as a solvent, a surfactant, and various chemical materials. Particularly, compounds obtained by ethoxylating or propoxylating alcohol, fatty acid, amine, or alkylphenol can be used as nonionic surfactants for a wide range of application.

Those alkylene oxide adducts having a narrow alkylene oxide adduct molar distribution are more advantageous than alkylene oxide adducts having a wide distribution. For example, alcohol ethoxylate having a narrow ethylene oxide adduct molar distribution has the following advantages. The alcohol ethoxylate does not give off an offensive odor due to a small amount of residual unreacted alcohol, has a high cloud point, and is highly soluble in water and produces a narrow gelling region in an aqueous solution. The alcohol ethoxylate also has low pour point and great ability to reduce interfacial tension. In addition, the alcohol ethoxylate shows excellent foaming, penetrating, solubilization, and detergency.

Alkylene oxide adducts having a narrow alkylene oxide adduct molar distribution can be produced using an acid catalyst such as a Lewis acid or Friedel-Crafts catalyst. In this method, however, the distribution is not narrow enough, and a large amount of undesirable by-products such as dioxane, dioxolane, or polyalkylene glycol are produced. In addition, the acid catalyst has many disadvantages in an industrial context, for example, it strongly corrodes metal.

Therefore, as a method of producing alkylene oxide adduct which narrows alkylene oxide adduct molar distribution without a side reaction, the following methods have been proposed. U.S. Pat. No. 4,239,917 describes a method for producing ethylene oxide adduct having narrow adduct molar distribution by using barium oxide as an ethoxylation catalyst and reacting alkanol with ethylene oxide. Laid-open Japanese Patent Application No. (Tokkai sho) 58-189128 describes a method for producing alkylene oxide adduct having narrow adduct molar distribution by reacting a compound having one or more active hydrogen with alkylene oxide in the presence of basic salt of calcium and/or strontium and a promoter such as phosphoric acid. Laid-open Japanese Patent Application No. (Tokkai hei) 1-164437 relates to a method for producing alkylene oxide adduct having narrow adduct molar distribution from an organic compound having one or more active hydrogen and alkylene oxide using magnesium oxide with metal ion such as aluminum added as a catalyst. Laid-open Japanese Patent Application No. (Tokkai hei) 2-71841 discusses a method of producing alkylene oxide adduct having narrow adduct molar distribution from a compound having one or more active hydrogen and alkylene oxide using calcined hydrotalcite as a catalyst.

In these conventional methods, a small amount of by-products is produced, and alkylene oxide adduct molar distribution is narrow. However, because a heterogeneous catalyst is used, a catalyst separating step for separating a catalyst from reaction products (for example, filtering) is required. From a practical standpoint, it is necessary to both perform this catalyst separating step efficiently and reduce the cost of the alkylene oxide adduct.

SUMMARY OF THE INVENTION

In this invention, a highly activated catalyst is employed, and a minor amount of the catalyst is used in the reaction in order to reduce the load in a catalyst separating step and perform the step efficiently.

Also, by using a highly activated catalyst, the amount of added alkylene oxide per unit time and unit catalyst increases, so that the reaction time can be decreased compared with the use of the same amount of traditional catalyst.

Therefore, the present invention seeks to provide a method of producing alkylene oxide adduct having a narrow alkylene oxide adduct molar distribution from an organic compound having one or more active hydrogen and alkylene oxide, by providing a catalyst having higher catalytic activity, to produce alkylene oxide adduct which has a narrow alkylene oxide adduct molar distribution and is inexpensive.

The present invention relates to a method of producing an alkylene oxide adduct which comprises reacting an organic compound having one or more active hydrogen with at least one alkylene oxide in the presence of at least one Al.Mg composite oxide catalyst. The catalyst can be obtained by calcining and activating aluminum magnesium hydroxide of formula (I), wherein n and m are positive numbers.

$$nMgO.Al_2O_3.mH_2O \qquad (I)$$

According to the method of the present invention, a product having a narrow alkylene oxide adduct molar distribution can be produced. Also, the catalytic activity of the catalyst is almost doubled compared with, for example, that of conventional calcined hydrotalcite, so that only a minor amount of the catalyst is used in a reaction. Therefore, the load in a catalyst separating step can be reduced, and reaction time can be reduced, which are industrially very advantageous.

The organic compound having one or more active hydrogen is preferably at least one compound selected from a group consisting of alcohols, fatty acids, hydroxy fatty acids, fatty acid amides, fatty amines, alkylphenols, glycol ethers, and polyalkylene glycols.

In the above-mentioned method, the alcohol is preferably at least one alcohol selected from linear or branched primary alcohols and secondary alcohols having 2 to 30 carbon atoms.

The alcohol is more preferably selected from among primary alcohols having 6 to 24 carbon atoms and mixtures thereof.

In the above-mentioned method, the fatty acid is preferably selected from fatty acids having 8 to 22 carbon atoms and mixtures thereof.

In the above-mentioned method, the glycol ether is preferably monoalkyl ether in which an alkyl group having 1 to 6 carbon atoms is added to ethylene glycol.

In the above-mentioned method, in the general formula (I) showing aluminum magnesium hydroxide, n is preferably 1 to 3.

In the above-mentioned method, calcining and activating the aluminum magnesium hydroxide occurs at a preferred temperature of 200° to 1000° C.

DETAILED DESCRIPTION OF THE PREFERRED EMBODIMENTS

Figure 1:
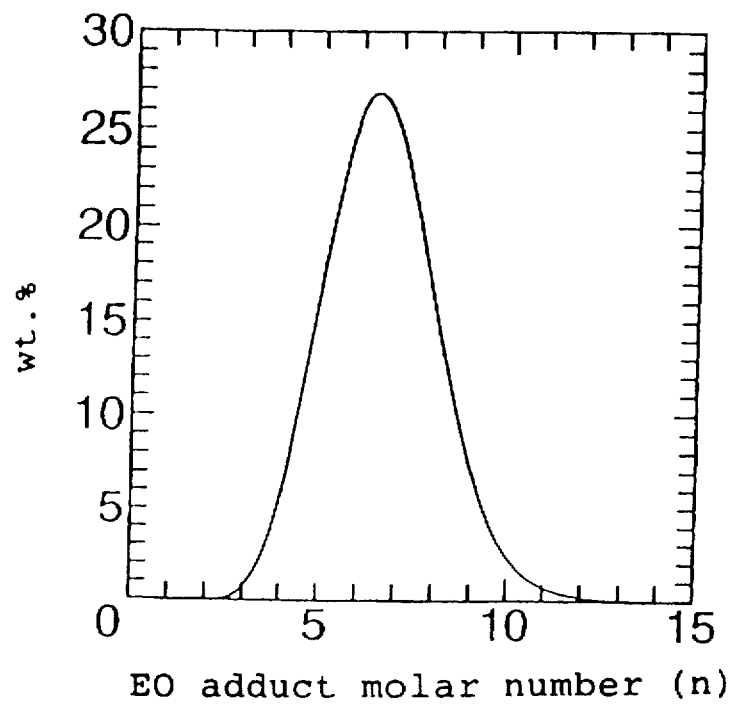
FIG. 1 is a graph showing the EO adduct molar number distribution of ethylene oxide (EO) adduct obtained in Example 1.

The organic compound having one or more active hydrogen which can be used in the present invention may be any compound if it can be alkoxylated. Examples of such an organic compound are alcohols, fatty acids, hydroxy fatty acids, fatty acid amides, fatty amines, alkylphenols, glycol ethers, polyalkylene glycols, or mixtures thereof. Typical examples of them are illustrated in the following.

Saturated or unsaturated primary or secondary alcohols having 2 to 30 carbon atoms is preferably used. Primary alcohols having 6 to 24 carbon atoms is more preferably used.

Fatty acids having 8 to 22 carbon atoms is preferably used. Examples of such fatty acids are saturated or unsaturated linear fatty acid obtained by fat decomposition of coconut oil, palm oil, palm kernel oil, soybean oil, sunflower oil, rapeseed oil, fish fat, beef tallow, etc.,(for example, caprylic acid, n-capric acid, lauric acid, myristic acid, oleic acid, and stearic acid) or a mixture thereof.

Natural or synthetic hydroxy fatty acids, particularly one having 16 to 22 carbon atoms, is preferably used. Examples of such hydroxy fatty acids are ricinolic acid and 12-hydroxystearic acid.

A derivative obtained by reacting a saturated or unsaturated linear fatty acid with ammonia or primary aliphatic amine is preferably used as a fatty acid amide.

Primary fatty amines obtained from saturated and unsaturated linear fatty acid or a compound in which nitrile is introduced into corresponding aliphatic alcohol is preferably used.

Mono-, di-, or trialkylphenols, particularly one having 4 to 12 carbon atoms in an alkyl group, is also preferably used.

Monoalkyl ethers in which an alkyl group having 1 to 6 carbon atoms is added to ethylene glycol can be employed as glycol ethers.

Polyethylene glycol or polypropylene glycol are typical examples of polyalkylene glycols. The preferable polyalkylene glycol has an average degree of polymerization of 2 to 2000.

Alkylene oxides having 2 to 8 carbon atoms are preferably used in the present invention. The most preferable alkylene oxide are ethylene oxide and propylene oxide having 2 to 3 carbon atoms.

The catalyst that can be used in the present invention is a highly active catalyst obtained by calcining aluminum magnesium hydroxide (same as aluminum hydroxide - magnesium hydroxide coprecipitate) of formula (I) and activating the aluminum magnesium hydroxide as Al—Mg composite oxide.

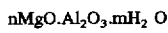

$$nMgO.Al_2O_3.mH_2O \quad (I)$$

In the above general formula, n and m are positive numbers and should not be limited to specific numbers, however, n is preferably 1 to 3, most preferably about 2.5, and m is preferably 3 to 11, most preferably about 5.5. In the calcining and activating process in forming the catalyst, a calcination temperature for calcining and activating is preferably 200° to 1000° C., and more preferably 300° to 800° C. While calcination time and atomosphere should not be specifically limited, calcination is preferably performed in inert gas for 1 to 6 hours.

The alkoxylation reaction using the solid catalyst of the present invention can be easily performed in accordance with a common procedure and reaction conditions. The reaction temperature is preferably 80° to 230° C., more preferably 120° to 200° C., and most preferably 160° to 180° C. The reaction pressure is preferably 0 to 20 atm and more preferably 2 to 8 atm although it depends on the reaction temperature. Although the amount of the catalyst varies depending on the mole ratio of alkylene oxide and starting material such as alcohol to be reacted together, the amount is preferably within the range of 0.05 to 20 wt % with respect to the amount of the starting material such as alcohol, and more preferably 0.1 to 5 wt %.

The reaction operation is as follows. For example, the starting materials such as an alcohol and a catalyst are charged in an autoclave. After the substitution of nitrogen gas for the air in the autoclave, an alkylene oxide is introduced into the autoclave to be reacted with the starting material in the presence of the catalyst under a predetermined temperature and pressure conditions. Although the catalyst separating method is not specifically limited, after the reaction, the reaction product can be cooled, and, for example, water to decrease viscosity and a filter aid (diatomaceous earth, a cellulose aid, activated clay, etc.) can be added to separate the catalyst by filtering. The product obtained by the method of the present invention is essentially neutral. Therefore, the product need not be neutralized by adding acid or alkali. It should be recognized that any art-recognized technique for catalyst separation can be employed.

According to the present invention, in the addition polymerization reaction of a compound having one or more active hydrogen with alkylene oxide, by using an alkoxylation catalyst consisting of specific Al—Mg composite oxide, a highly active reaction can be performed, and alkylene oxide adduct having very narrow alkylene oxide adduct molar distribution can be obtained.

Since the alkoxylation catalyst used in the present invention is highly active, the addition polymerization reaction can be performed with a small amount of the catalyst. As a result, the load in the catalyst separating step can be reduced, and the catalyst can be separated efficiently. Therefore, an alkylene oxide adduct can be produced at low cost.

Also, due to the high catalytic activity, when a conventional amount of the catalyst is used for the reaction, the reaction is performed at high speed, and the reaction time is reduced. Therefore, an alkylene oxide adduct can be produced at low cost.

The present invention will be described below in detail by way of examples and comparative examples. These examples are illustrative in nature and should not limit the invention.

EXAMPLE 1

25 g of aluminum magnesium hydroxide with the chemical composition of $2.5MgO.Al_2O_3.mH_2O$ (KYOWAAD (registered trademark) 300 manufactured by Kyowa Chemical Industry) was calcined and activated at 500° C. for 3 hours to obtain 17 g of Al—Mg composite oxide catalyst powder of the present invention.

Next, 400 g of lauryl alcohol and 1.2 g (0.3 wt % with respect to alcohol) of the above-mentioned catalyst were charged in an autoclave, and nitrogen gas was substituted for the air in the autoclave. The autoclave content was heated while being stirred. The temperature was maintained at 180°

C. and the pressure was maintained at 3 atm. 663 g of ethylene oxide (EO) was introduced into the autoclave and was reacted with lauryl alcohol in the presence of the catalyst. The catalytic activity was 11.3 (g-EO/(min.g-cat)). After aging, the reaction liquid was cooled to 80° C. After 188 g of water and 3.8 g of activated clay and diatomaceous earth as a filter aid were added, the catalyst was separated by filtering. The EO adduct molar distribution of the resultant ethoxylate is shown in FIG. 1. In FIG. 1, the vertical axis represents the wt % of each ethoxylate component with respect to the ethoxylate weight, and the horizontal axis represents EO adduct molar numbers.

Comparative Example 1

25 g of hydrotalcite having the chemical composition of $Mg_6Al_2(OH)_{16}CO_3.4H_2O$ (KYOWAAD(registered trademark) 500 manufactured by Kyowa Chemical Industry) was calcined and activated at 500° C. for 3 hours to obtain 14.5 g of catalyst powder.

An ethoxylation reaction was performed following the same procedure as in Example 1 except that the above-mentioned calcined hydrotalcite was used. The catalytic activity was 6.2 (g-EO/(min.g-cat)).

EXAMPLE 2

25 g of the same aluminum magnesium hydroxide as in the Example 1 was calcined and activated at 300° C. for 3 hours to obtain 19 g of Al—Mg composite oxide catalyst powder of the present invention.

Next, 400 g of lauryl alcohol and 1.2 g (0.3 wt % with respect to alcohol) of the above-mentioned catalyst were charged in an autoclave. Following the same procedure as in Example 1, 663 g EO was introduced into the autoclave to perform an ethoxylation reaction. As a result, alcohol ethoxylate having an average EO adduct molar number of 7.0 was obtained. The catalytic activity was 14.1 (g-EO/(min.g-cat)).

EXAMPLE 3

400 g of DIADOL-13 (synthetic C13 alcohol consisting of the mixture of linear and branched alcohol manufactured by Mitsubishi Chemical Corporation) was charged in an autoclave. Following the same procedure as in Example 1, 611 g EO was introduced into the autoclave to perform a reaction. The catalytic activity was 10.8 (g-EO/(min.g-cat)).

Figure 2:
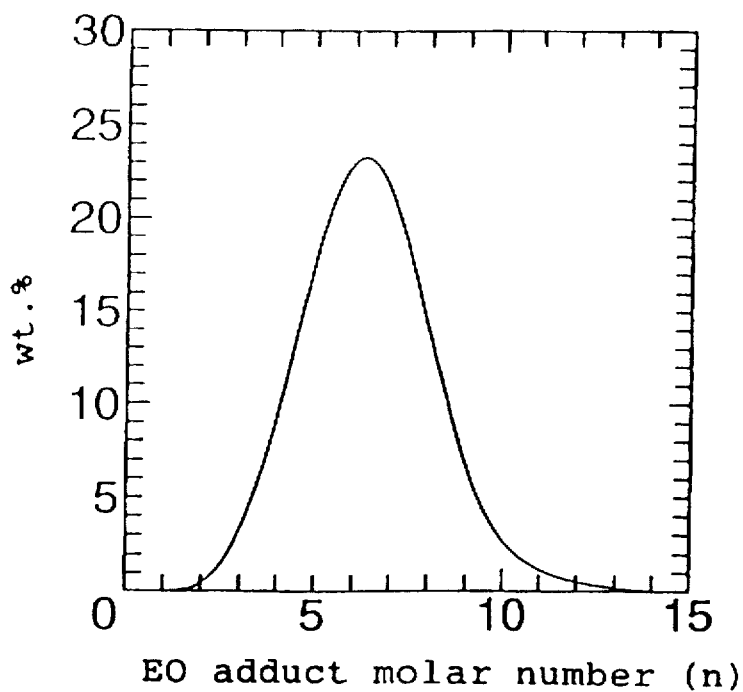
FIG. 2 is a graph showing the EO adduct molar number distribution of ethylene oxide (EO) adduct obtained in Example 2.

Next, the catalyst was separated by filtering following the same procedure as in Example 1 to obtain alcohol ethoxylate having an average EO adduct molar number of 7.0. The EO adduct molar distribution of the resultant ethoxylate is shown in FIG. 2.

EXAMPLE 4

400 g of lauric acid and 1.2 g of the catalyst obtained in Example 1 were charged in an autoclave. Following the same procedure as in Example 1, 617 g EO was introduced into the autoclave to perform a reaction. Then, the catalyst was separated by filtering to obtain 1017 g of lauric acid ethoxylate having an average EO adduct molar number of 7.0.

EXAMPLE 5

400 g of polyethylene glycol having an average molecular weight of 400 and 1.2 g of the catalyst obtained in Example 1 were charged in an autoclave. Following the same procedure as in Example 1, 600 g EO was introduced into the autoclave to perform a reaction. Then, the catalyst was separated by filtering to obtain 1000 g of polyethylene glycol having an average molecular weight of 1000.

EXAMPLE 6

300 g of n-dodecylamine and 0.9 g of the catalyst obtained in Example 1 were charged in an autoclave. Following the same procedure as in Example 1, 500 g EO was introduced into the autoclave to perform a reaction. Then, the catalyst was separated by filtering to obtain 800 g of EO adduct having an average EO adduct molar number of 7.0.

EXAMPLE 7

750 g of butyl cellosolve and 2.1 g of the catalyst obtained in Example 1 were charged in an autoclave. The reaction temperature was maintained at 180° C. and the pressure was maintained at 3.5 atm. 737 g of propylene oxide (PO) was introduced into the autoclave and was reacted with butyl cellosolve in the presence of the catalyst. Then, the reaction liquid was cooled to 110° C. A slight amount of PO remaining in the product was removed by distillation under a reduced pressure for 30 min. Then, the catalyst was separated by filtering following the same procedure as in Example 1 to obtain 1487 g of alkylene glycol monobutyl ether.

EXAMPLE 8

400 g of 12-hydroxystearic acid and 1.2 g of the catalyst obtained in Example 1 were charged in an autoclave. Following the same procedure as in Example 1, 410 g EO was introduced into the autoclave to perform a reaction. Then, the catalyst was separated by filtering to obtain 810 g of EO adduct having an average EO adduct molar number of 7.0.

EXAMPLE 9

400 g of laurylamide and 1.2 g of the catalyst obtained in Example 1 were charged in an autoclave. Following the same procedure as in Example 1, 620 g EO was introduced into the autoclave to perform a reaction. Then, the catalyst was separated by filtering following the same procedure as in Example 1 to obtain 1020 g of EO adduct having an average EO adduct molar number of 7.0.

EXAMPLE 10

200 g of isooctyl phenol and 0.6 g of the catalyst obtained in Example 1 were charged in an autoclave. Following the same procedure as in Example 1, 447 g EO was introduced into the autoclave to perform a reaction. Then, the catalyst was separated by filtering to obtain 647 g of isooctyl phenol ethoxylate having an average EO adduct molar number of 10.

EXAMPLE 11

25 g of aluminum magnesium hydroxide with the chemical composition of $2.5MgO.Al_2O_3.mH_2O$ (KYOWAAD (registered trademark) 300 manufactured by Kyowa Chemical Industry) was calcined and activated at 700° C. for 3 hours to obtain 14 g of Al—Mg composite oxide catalyst powder of the present invention.

Next, 400 g of lauryl alcohol and 0.4 g (0.1 wt % with respect to alcohol) of the above-mentioned catalyst were charged in an autoclave, and nitrogen gas was substituted for the air in the autoclave. The autoclave content was heated while being stirred. The temperature was maintained at 180° C. and the pressure was maintained at 3 atm. 663 g of ethylene oxide (EO) was introduced into the autoclave to perform a reaction. The catalytic activity was 11.0 (g-EO/(min.g-cat)).

EXAMPLE 12

25 g of aluminum magnesium hydroxide with the chemical composition of $2.5MgO \cdot Al_2O_3 \cdot mH_2O$ (KYOWAAD (registered trademark) 300 manufactured by Kyowa Chemical Industry) was calcined and activated at 700° C. for 3 hours to obtain 14 g of Al—Mg composite oxide catalyst powder of the present invention.

Next, 400 g of octadecyl alcohol and 0.4 g (0.1 wt % with respect to alcohol) of the above-mentioned catalyst were charged in an autoclave, and nitrogen gas was substituted for the air in the autoclave. The autoclave content was heated while being stirred. The temperature was maintained at 180° C. and the pressure was maintained at 3 atm. 454 g of ethylene oxide (EO) was introduced into the autoclave to perform a reaction. The catalytic activity was 6.8 (g-EO/(min.g-cat)).

The present invention has been described in terms of certain preferred embodiments. However, it should be recognized that various modifications, substitutions, changes, ommissions and the like, may be made without departing from the spirit thereof.

What is claimed is:

1. A method of producing an alkylene oxide adduct comprising reacting at least one organic compound having at least one active hydrogen with alkylene oxide in the presence of an Al.Mg composite oxide catalyst obtained by calcining and activating an aluminum magnesium hydroxide having the following general formula (I):

$$nMgO \cdot Al_2O_3 \cdot mH_2O \quad (I)$$

wherein n and m are positive numbers.

2. The method according to claim 1, wherein the organic compound having at least one active hydrogen is at least one compound selected from a group consisting of alcohols, fatty acids, hydroxy fatty acids, fatty acid amides, fatty amines, alkylphenols, glycol ethers, and polyalkylene glycols.

3. The method according to claim 2, wherein the at least one organic compound is at least one alcohol selected from linear or branched primary alcohols and secondary alcohols having 2 to 30 carbon atoms.

4. The method according to claim 2, wherein the at least one organic compound is at least one primary alcohol having 6 to 24 carbon atoms.

5. The method according to claim 2, wherein the at least one organic compound is at least one fatty acid having 8 to 22 carbon atoms.

6. The method according to claim 2, wherein the at least one organic compound is at least one monoalkyl ether in which an alkyl group having 1 to 6 carbon atoms is added to ethylene glycol.

7. The method according to claim 1, wherein, in formula (I), n is 1 to 3.

8. The method according to claim 1, wherein calcining and activating the aluminum magnesium hydroxide occurs at a temperature of 200° to 1000° C.

9. The method according to claim 2, wherein the at least one organic compound is at least one selected from polyethylene glycol and polypropylene glycol having a number average degree of polymerization within the range of 2 to 2000.

10. The method according to claim 1, wherein the alkylene oxide is at least one selected from polyethylene oxide and polypropylene oxide.

* * * * *